(12) United States Patent
Overton

(10) Patent No.: US 6,271,879 B1
(45) Date of Patent: Aug. 7, 2001

(54) CONTROLLING AND DETECTING ALIGNMENT OF COMPOSITE VIDEO COLOR FRAMES

(75) Inventor: Michael S. Overton, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/055,074

(22) Filed: Apr. 3, 1998

(51) Int. Cl.[7] .............................. H04N 17/00; H04N 5/04; H04N 9/45
(52) U.S. Cl. .................... 348/180; 348/180; 348/189; 348/190; 348/195; 348/502; 348/505
(58) Field of Search .................... 348/180, 190, 348/189, 502, 505, 507, 508, 514, 513, 517, 519, 520, 527, 539, 192

(56) References Cited

U.S. PATENT DOCUMENTS

| | | | |
|---|---|---|---|
| 4,646,151 | * | 2/1987 | Welles, II et al. .................... 358/149 |
| 4,694,324 | * | 9/1987 | Matney .................................. 358/10 |
| 4,853,796 | * | 8/1989 | Suesada et al. ...................... 358/324 |
| 5,208,666 | * | 5/1993 | Elkind et al. ........................ 358/139 |
| 5,351,093 | * | 9/1994 | Brown et al. ........................ 348/530 |
| 5,574,500 | * | 11/1996 | Hamada et al. ...................... 340/180 |
| 5,579,056 | * | 11/1996 | Chang .................................. 348/555 |
| 5,596,364 | * | 1/1997 | Wolf et al. ............................ 348/192 |
| 5,710,593 | * | 1/1998 | Reynolds .............................. 348/181 |
| 5,786,865 | * | 7/1998 | Ayzenberg et al. .................. 348/505 |
| 5,818,520 | * | 10/1998 | Janko et al. .......................... 348/192 |
| 5,877,815 | * | 3/1999 | Tsujimura ............................ 348/515 |
| 5,940,124 | * | 8/1999 | Janko et al. .......................... 348/189 |

* cited by examiner

Primary Examiner—Reinhard J. Eisenzopf
Assistant Examiner—Paulos Natnael
(74) Attorney, Agent, or Firm—Francis I. Gray

(57) ABSTRACT

An apparatus and method for controlling and detecting the alignment of a color frame phase from a composite analog video signal decodes the composite analog video signal to produce a component digital video signal and to generate a color frame signal that represents the start of each color frame for the composite analog video signal. Based upon the color frame signal a flag signal is inserted into the component digital video signal. The component digital video signal is captured by an analyzer based upon the flag signal so that the captured component digital video signal is in color frame phase with a stored reference component digital video signal. Preferably the stored reference component digital video signal represents a test sequence having an integer number of color frames plus or minus one video frame.

9 Claims, 5 Drawing Sheets

ANALYZER: (NO ROLLING SEQUENCE)
1. CAPTURE VIDEO SEQUENCE W/FLAG
2. CHECK FLAG FOR COLOR FRAME PHASE
3. SELECT REFERENCE SEQUENCE HAVING SAME COLOR FRAME PHASE
4. PERFORM MEASUREMENT USING DIFERENCING TECHNIQUE

ANALYZER: (NO ROLLING SEQUENCE)
1. CAPTURE VIDEO SEQUENCE W/FLAG
2. CHECK FLAG FOR COLOR FRAME PHASE
3. SELECT REFERENCE SEQUENCE HAVING SAME COLOR FRAME PHASE
4. PERFORM MEASUREMENT USING DIFERENCING TECHNIQUE

|  | TEST SEQUENCE FIELDS | NTSC | | PAL | | | |
|---|---|---|---|---|---|---|---|
| F1 | 1 | 1 | 3 | 1 | 7 | 5 | 3 |
|  | 2 | 2 | 4 | 2 | 8 | 6 | 4 |
| F2 | 3 | CF⟨3 | 1 | 3 | ⟨1 | 7 | 5 |
|  | 4 | 4 | 2⟩ | 4 | 2 | 8 | 6 |
| F3 | 5 | 1 | 3 ⟩CF | 5 | 3 | 1 | 7 |
|  | 6 | 2 | 4 | 6 | 4 | 2 | 8 |
| F4 | 7 | 3 | 1 | 7 CF⟨ 5 | 3 | 1 |
|  | 8 | 4 | 2 | 8 | 6 | 4 | 2⟩ |
| F5 | 9 | 1 | 3 | 1 | 7 | 5 | 3 |
|  | 10 | 2 | 4 | 2 | ⟨8 | 6 | 4 ⟩CF |
| F6 | 11 | 3 | 1 | 3 | 1 | 7 | 5 |
|  | 12 | 4 | 2 | 4 | 2 | 8 | 6 |
| F7 | 13 | 1 | 3 | 5 | 3 | 1 | 7 |
|  | 14 | 2 | 4 | 6 | 4 | 2 | 8⟩ |

CONTROLLING AND DETECTING ALIGNMENT OF COMPOSITE VIDEO COLOR FRAMES

CROSS-REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

The present invention relates to the measurement of video signals, and more particularly to a method of controlling and detecting alignment of composite video color frames when doing picture quality measurements using a differencing technique.

When measuring picture quality via a differencing technique, as in the PQA200 Picture Quality Analyzer manufactured by Tektronix, Inc. of Wilsonville, Oreg. and described in U.S. Pat. No. 5,18,520 issued Oct. 6, 1998 entitled "Programmable Instrument for Automatic Measurement of Compressed Video Quality", if the video system being measured has signals that are composite encoded per the NTSC, PAL or SECAM television standards, then the phase of the composite color frame sequence relative to a test reference sequence needs to be known and controlled. This problem is an extension of the general problem seen first in the analog component world where, if there are multiple generations of encode and decode between composite and component, then the phase of the original encoding must be preserved to insure quality video reproduction.

The root of the problem is that component signals are inherently only two-field sequences, whereas composite encoded NTSC is a four-field sequence, composite encoded PAL is an eight-field sequence and composite encoded SECAM is a twelve-field sequence as shown in FIG. 1. Many artifacts of the encode and decode process are different as a function of the subcarrier phase. Since the subcarrier phase changes over the color frame, if two encode and decode cycles are used with different color frame phase, then the artifacts interact and significantly reduce video quality. Thus the color frame phase of subsequent encode and decode cycles needs to be kept the same as the original.

This color frame phasing has historically been accomplished by using the color frame rate signal "Black Burst" as a reference for studio applications. This insures that all encoders use the same phase of the subcarrier burst when encoding. Decoders sense the color frame phase from the incoming composite signal. As the world moves to digital component video and MPEG compressed video, the black burst reference remains in studio use as the method to allow color frame phase control. The problem occurs in systems where the video is transmitted in a component format and there is no black burst reference on the receive end. In this case some other method is needed to allow this control. Examples of these other systems include MPEG satellite distribution to the home where there is no black burst reference available at the receiver, or any system where the encoders are not referenced to black burst.

Failure to control the color frame phase has two major problems in measuring video fidelity by a differencing technique. First, if the subcarrier phase used when storing a reference video sequence is different from that used when making a measurement of the video sequence from a system under test (SUT), then the encoder/decoder artifacts do not subtract out and the degradation measured is higher than it should be as it includes such artifacts. If the subcarrier phase is uncontrolled, then this results in, for example, bimodal distribution of results for NTSC and three or four modes for PAL.

The second problem is when there is a second set of encode and decode functions in the SUT. If the phase of the second encode does not match the phase of the first, then the interaction stated above occurs and serious video fidelity reduction results. The differencing technique correctly reports the reduction in video quality, but unless the cause is detected and reported customers may misinterpret or not trust the results.

What is desired is a color frame phasing control and detection method for aligning composite color frames when doing picture quality measurements using a differencing technique.

BRIEF SUMMARY OF THE INVENTION

Accordingly the present invention provides a method for controlling and detecting alignment of composite analog video color frames when doing picture quality measurements via a differencing technique by decoding the composite analog video signal to produce a component digital video signal and also to generate a color frame signal. The color frame signal is used to insert a flag signal into the component digital video signal at the beginning of each color frame. The flag signal is used by an analyzer to capture the component digital video signal when the color frame phase matches that of a stored reference component digital video signal. The reference component digital video signal may have a sequence length that is equal in video frames to an integer multiple of color frames plus or minus one video frame to provide a rolling sequence for comparison with the component digital video signal.

The objects, advantages and other novel features of the present invention are apparent from the following detailed description when read in conjunction with the appended claims and attached drawing.

DETAILED DESCRIPTION OF THE INVENTION

Figure 1:
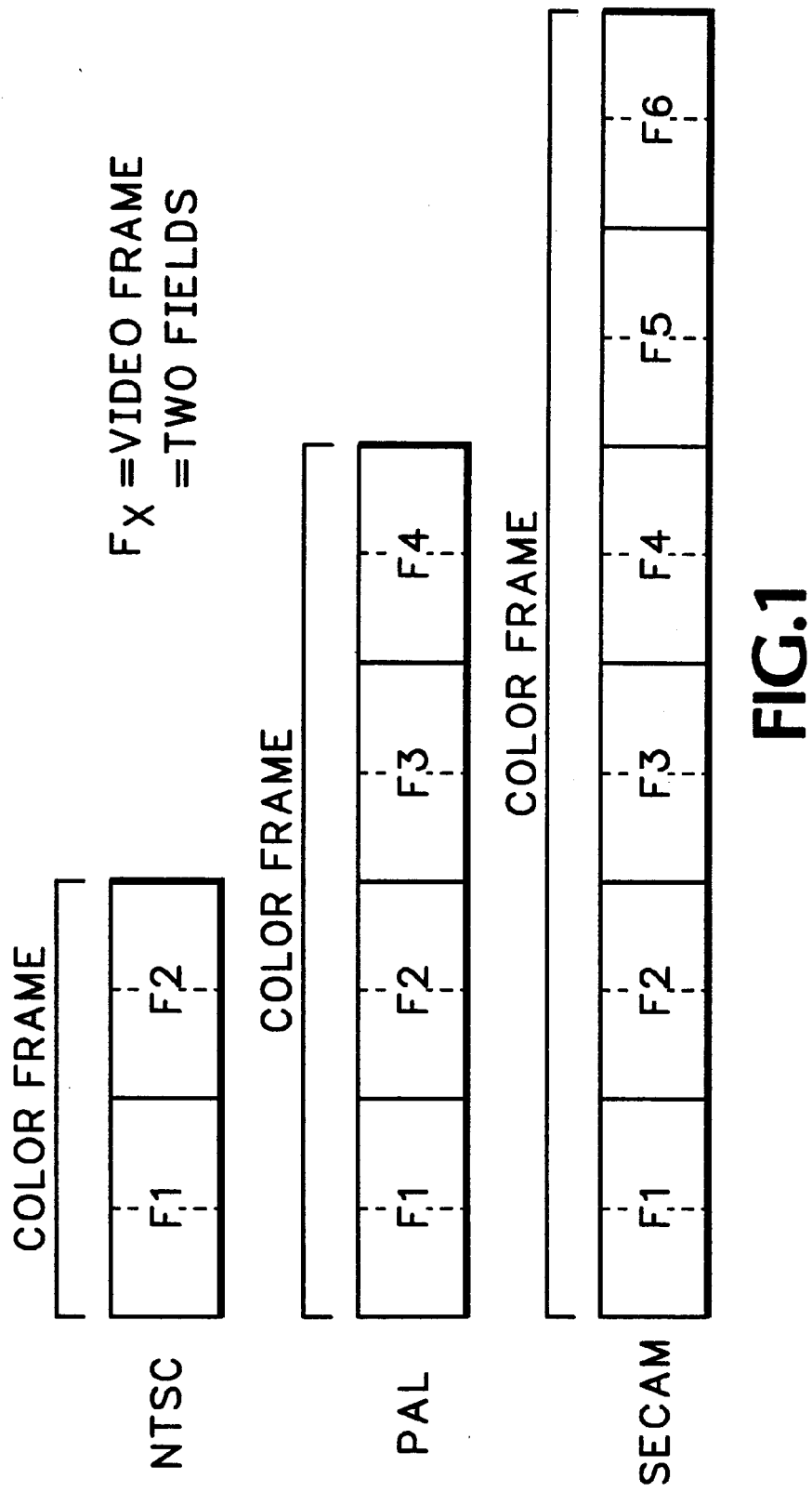
FIG. 1 is an illustrative view of color frames for different composite analog television standards.
Figure 2:
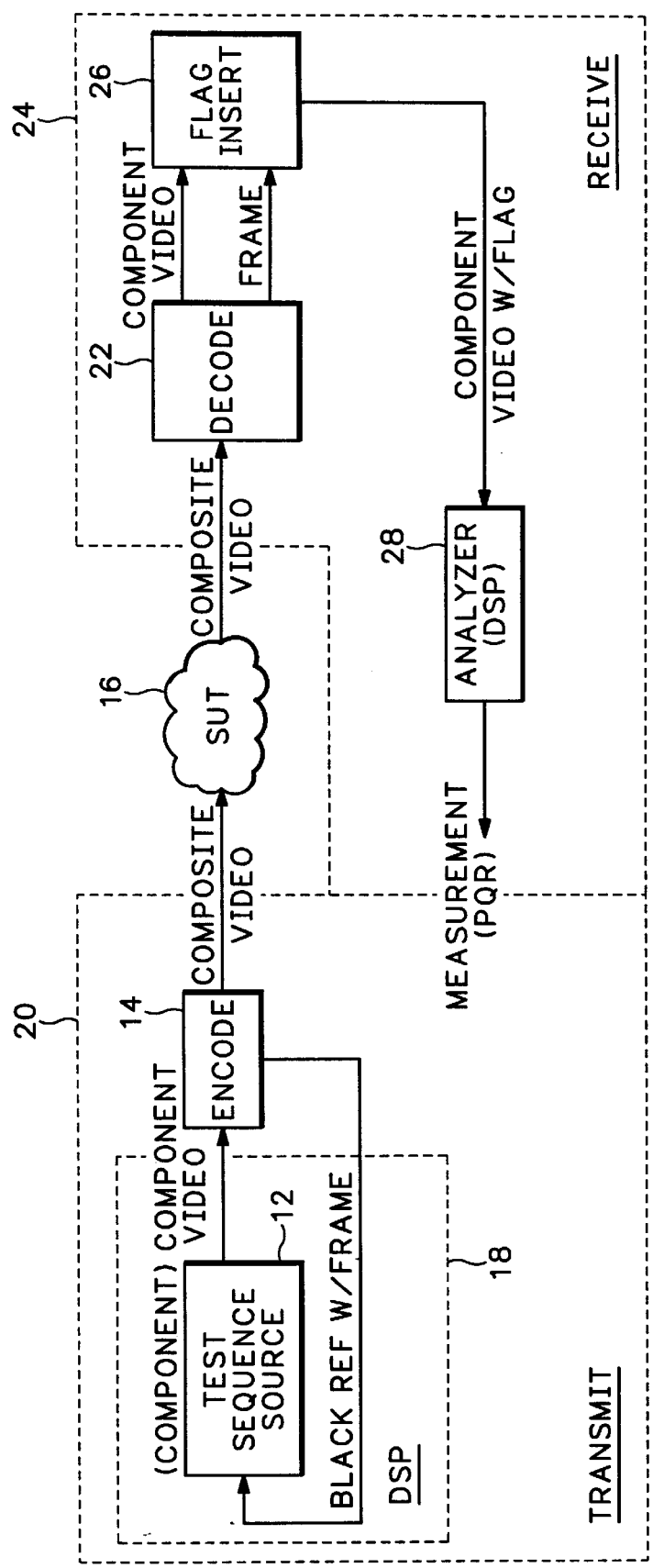
FIG. 2 is a block diagram view of a system for testing video fidelity from a system under test having a composite analog video input using control and detection of color frame phase alignment according to the present invention.

Referring now to FIG. 2 a source 12 of a video test sequence outputs a component digital video signal to an encoder 14 which converts the component digital video signal into a composite analog video signal according to a specified television standard, such as NTSC, PAL or SECAM. The encoder 14 provides a black reference with a frame flag indicating the start of a color frame to the source 12 to assure that the test sequence output from the encoder is always in the same color frame phase. The composite analog video signal is then applied to a system under test (SUT) 16. The source 12 may be part of a digital signal processor (DSP) board 18 located in a video signal generator transmitter 20 together with the encoder 14. The SUT 16 processes and outputs a composite analog video signal corresponding to the signal input from the encoder 14. The composite analog video signal from the SUT 16 is input to a decoder 22 in a receiver 24. The receiver 24 and transmitter 20 may be part of a single instrument, such as the Tektronix PQA200 Picture Quality Analyzer. The decoder 22 outputs a component digital video signal and a frame signal that indicates the starting field for a color frame. A flag insert circuit 26 inserts a flag signal into one component of the component digital signal, such as the luminance component, at a specified line and pixel location during the active video interval, i.e., after a start of active video (SAV) indicator for ITU-R BT.601-4 digital video. The flag inserted by the flag insert circuit 26 provides a visual indicator for a display screen so that an operator may see the indicator during testing. The value of the flag is large for the first field of the color frame from the received composite analog video signal, and small for the other fields. The component digital video signal with inserted flag from the flag inserter 26 is input to an analyzer digital signal processor 28 for comparison with a stored reference test sequence, as indicated in the above-mentioned patent.

The analyzer 28 captures the component digital video signal with the inserted flag, and checks the flag for the start of a color frame. The stored reference test sequence may be iterated so that there exists one reference sequence for each possible color frame phase—two reference sequences for NTSC, four references sequences for PAL or six references sequences for SECAM. Based upon the color frame phase of the captured video, the appropriate reference sequence is selected and the measurement is performed using the differencing technique as indicated in the patent referred to above.

Figure 3:
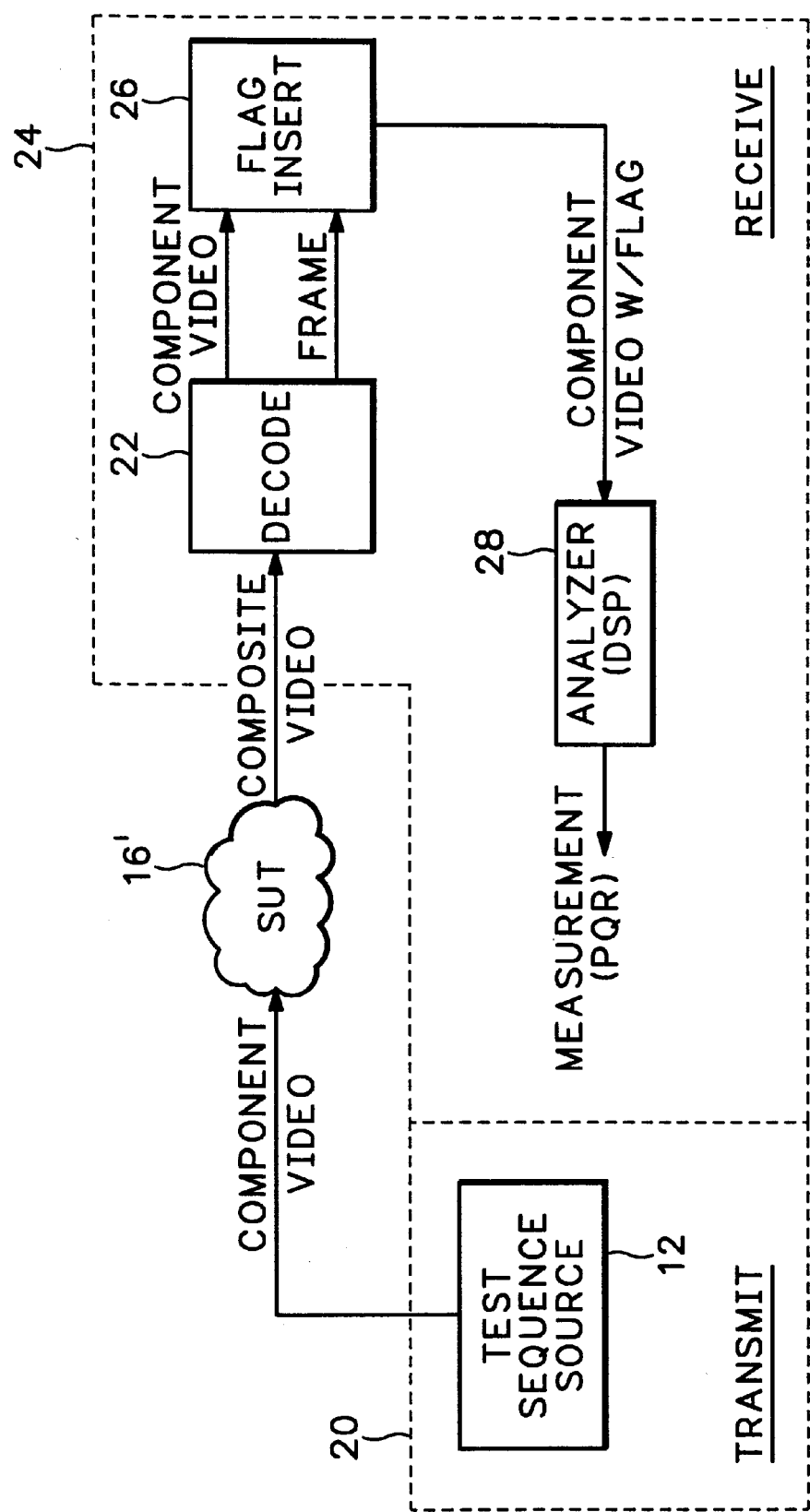
FIG. 3 is a block diagram view of a system for testing video fidelity from a system under test having a component digital video input using control and detection of color frame phase alignment according to the present invention.

FIG. 3 shows the same test setup for a system under test (SUT) 16' that has at least one encoder internally. In this situation the component digital video signal from the source 12 is input directly to the SUT 16' without using the encoder 14.

For the above discussion relative to FIG. 2, it was assumed that the video test sequence from the source 12 had an even number of frames that were a multiple of the number of frames included in a color frame for the particular composite video standard. However another implementation uses a "rolling" sequence—the test sequence has a number of frames equal to NxCF+/−1, where CF is a color frame (CF=2 for NTSC, =4 for PAL or =6 for SECAM) and N is an integer. In this situation only one reference test sequence is required in the receiver 24 when the test sequence from the source 12 is looped. For a 5 second reference sequence the total test sequence from the source 12 is 10 seconds for NTSC, 20 seconds for PAL and 30 seconds for SECAM. The analyzer DSP 28 captures the video sequence from the SUT 16 when the flag indicates that the particular loop of the test sequence has the same color frame phase as the reference test sequence. The rolling of the test sequence with respect to the reference sequence is illustrated in FIG. 4.

The rolling sequence method for single encode/decode SUTs 16, as shown in FIG. 2, insures that the inherent artifacts cancel in the subsequent differencing process by the analyzer 28. Also for "hybrid" systems where the SUT 16' is driven by a component digital video signal, but the output is in analog composite, as shown in FIG. 3, this method works well because it does not rely upon the encoder 14 that feeds back the color frame information to trigger the sequence source 12. Also only one reference sequence is required at the receiver 28 since the receiver waits for the output of the SUT 16 to match the color frame of the stored reference sequence.

Figures 4, 5:
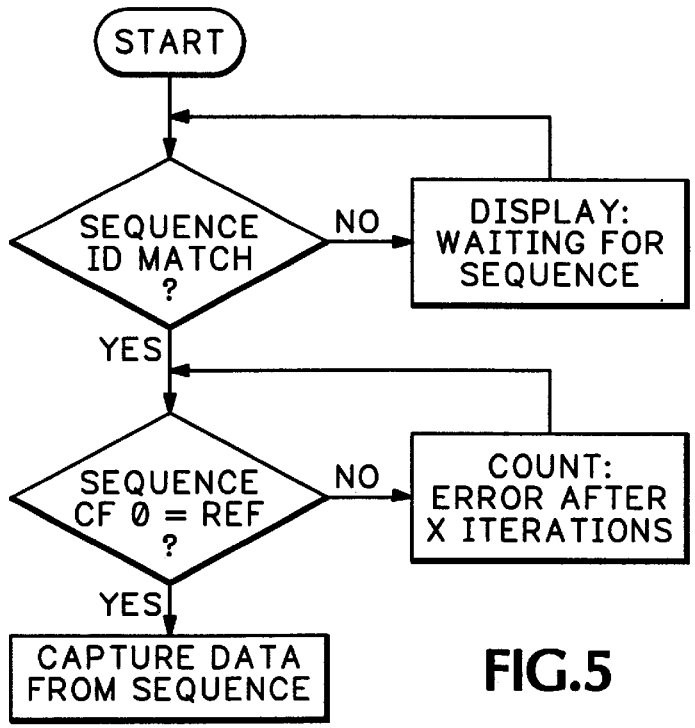
FIG. 4 is a table view illustrating test sequence rolling for control and detection of color frame phase alignment according to the present invention.
FIG. 5 is a conceptual flow diagram view of a process for capturing a video sequence from a system under test using control and detection of color frame phase alignment according to the present invention.
Figure 6:
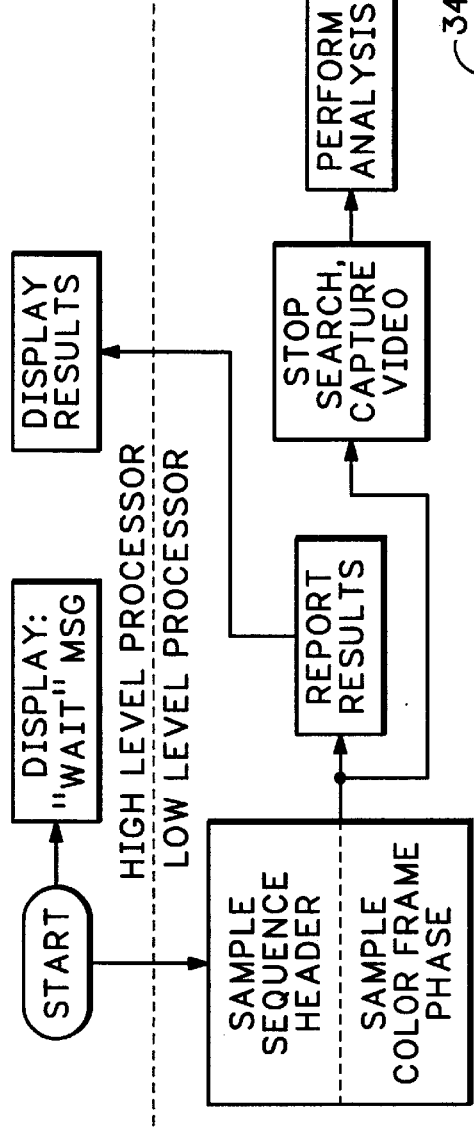
FIG. 6 is a more detailed flow diagram view of the process for capturing a video sequence from a system under test using control and detection of color frame phase alignment according to the present invention.

The analyzer DSP 28 examines the header for the test sequence from the SUT 16 to determine whether the test sequence is the same as the reference test sequence, as shown in FIG. 5. Once the test sequence is determined to correspond to the reference test sequence, the test sequence is searched for a color frame phase match. Once there is a color frame match, the analyzer DSP 28 captures the desired portion of the test sequence for picture quality analysis against the reference test sequence. In implementation as shown in FIG. 6 at the start a high level processor hands off to a low level processor to search the header of the test sequence from the SUT 16 for the correct sequence identifier corresponding to the reference sequence and simultaneously checks the flag location in the active video for the color frame phase flag value. Once the proper test sequence is detected and the color frame phase determined, the low level processor reports the results back to the high level processor for display. Also the search is stopped and the desired portion from the test sequence is captured. For a five second test sequence, only two seconds worth of video may be captured from the test sequence during the third and fourth seconds, for example. For the rolling test sequence the two seconds worth of video is taken from the particular iteration that matches the color frame phase of the reference sequence.

Figure 7:
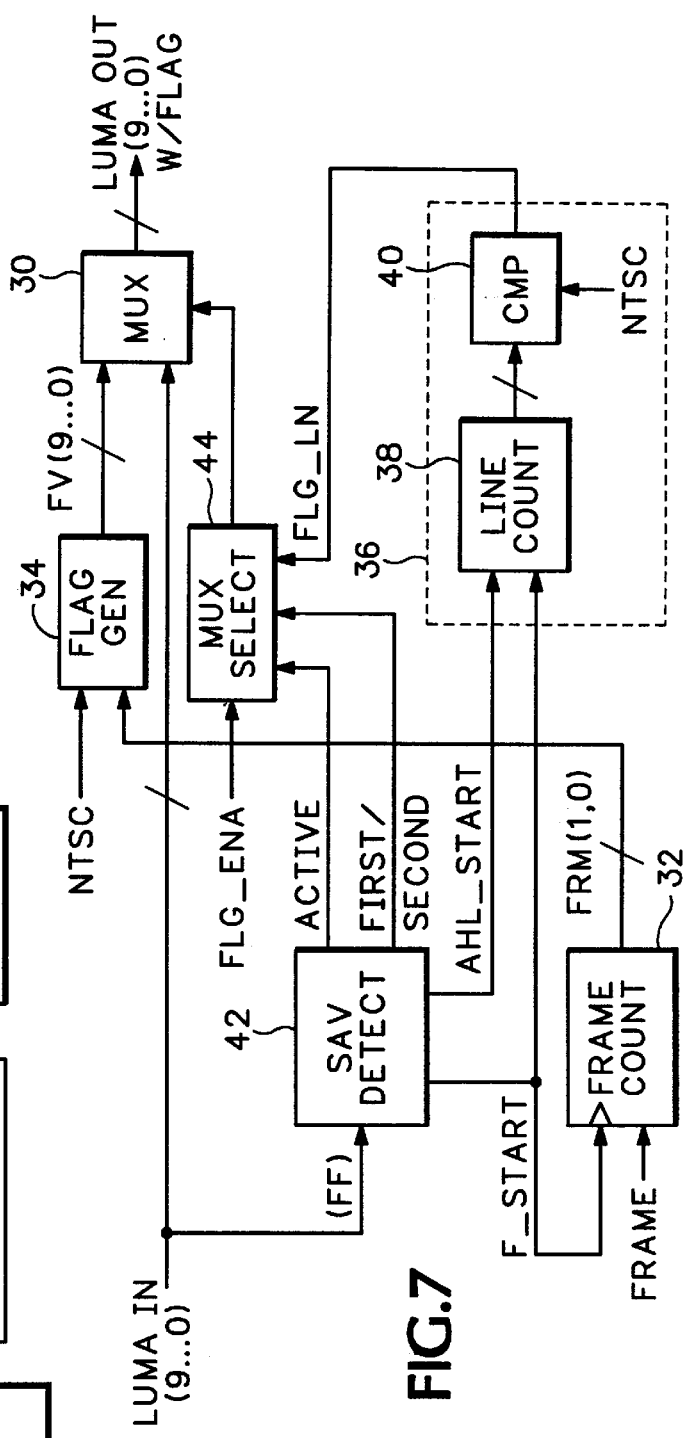
FIG. 7 is a simple block diagram view of an illustrative circuit for inserting a flag into one component of a component digital video signal for control and detection of color frame phase alignment according to the present invention.

One implementation of a flag insert circuit 26 is shown in FIG. 7. The inputs include an input signal (IN(9 . . . 0)), such as the component digital video signal from a conventional composite to digital component decoder in the decode circuit 22; a color frame signal (FRAME) derived from the SC/H phase and color burst portion of the composite analog video signal in the decode circuit; and enable (FLG_ENA) and standard (NTSC) commands provided externally. For this particular implementation the NTSC command selects between values for the NTSC standard and for the PAL standard. The input signal together with a flag signal (FV(9 . . . 0)) is input to a multiplexer 30 which is controlled by a select signal. The multiplexer 30 inserts the flag signal into the input signal to produce an output signal with flag. The output signal is transmitted as the component digital video signal with flag to the analyzer 28.

An SAV detection circuit 42, having the FF code and specific bits of the input signal as inputs, is provided to differentiate between the end of active video (EAV) and start of active video (SAV) sequences in the component digital video signal, and to provide an active video signal (ACTIVE) and a start of field one signal (F_START). The FRAME signal and F_START signals are input to a frame counter 32, where the FRAME signal clears the counter at the beginning of a color frame and the F_START signal increments the counter. The output from the frame counter 32 is a frame count signal (FRM(1,0)). For NTSC the count alternates between 0 and 1 since there are two frames per color frame, and for PAL the count ranges from 0 to 3 since there are four frames per color frame. The FRM(1,0) signal is input to a flag value generator circuit 34 that produces the FV(9 . . . 0) signal for insertion into the IN(9 . . . 0) signal at the multiplexer 30. The value output by the flag value generator circuit 34 depends upon the frame number within the color frame and the particular standard indicated by the NTSC command. For the sake of a visual display the value is high for the first field of the color frame and significantly lower for the remaining fields.

A line select circuit 36 includes a line counter 38 and a comparator 40. The line counter 38 is cleared by F_START and incremented by an active video line signal from the SAV detector 42. The count from the line counter 38 is input to the comparator 40 together with the NTSC command which determines which of two values (for NTSC or PAL) is compared to the count. When there is a match, the comparator 40 outputs a flag line signal (FLG_LN). The FLG_LN signal is input to a multiplexer select circuit 44 to which also are input the ACTIVE signal from the SAV detector 42 and the FLG_ENA command. The SAV detector 42 also provides a pixel count (FIRST, SECOND) to the select circuit 44 so that, when enabled by FLG_ENA command, at the line indicated by the FLG_LN signal and for the pixels indicated by FIRST and SECOND the select circuit causes the multiplexer 30 to pass the FV(9 . . . 0) values in lieu of the IN(9 . . . 0) values to the output.

For situations as in FIG. 2 where full source control is in effect due to the feedback of color frame information from the encoder 14 to the source 12, a color frame inversion by the SUT 16 may be detected. Since the receiver 24 knows with what phase the test sequence was generated from the source 12, it detects and displays to the operator if it has been changed by the SUT 16. This only works for an odd number of phase inversions. An even number of inversions is not detectable, but the deleterious effects on the measurement remain since the encoder/decoder artifacts are not canceled by the differencing.

It is harder to detect color frame phase inversion when using the rolling sequence method where there are multiple encode/decode cycles. One method is to design the encoder 14 to have a mode where it places a large change in the test sequence at the color frame rate. This second type of flag is only used to diagnose possible color frame inversions. At the receiver 24 the analyzer 28 looks to see if the first and second flags agree as to color phase—if not then an error has occurred. Another method is to have the test sequence source 12 be able to generate non-rolling sequences as well as rolling sequences. Even if these non-rolling sequences are not triggered such that they have a known phase, the phase may be measured relative to the sequence count at both ends and compared. If the phase relative to the sequence count has changed, then the color frame phase has not been preserved. Again these methods only detect an odd number of inversions.

Thus the present invention provides an apparatus and method for controlling and detecting the alignment of composite analog video color frames by inserting a flag into one channel of the decoded component digital video signal and using the flag in an analyzer to determine what video test sequence from a system under test to capture for comparison with a reference test sequence using a differencing technique to produce a picture quality measurement for the system under test, the test sequence preferably being a rolling sequence having a length one frame longer or shorter than an integer number of color frames.

What is claimed is:

1. An apparatus for controlling and detecting the alignment of a color frame phase from a composite analog video signal comprising:

means for decoding the composite analog video signal to produce a component digital video signal and to generate a color frame signal at the start of each color frame of the composite analog video signal;

means for inserting in response to the color frame signal a flag signal into one of the components of the component digital video signal to indicate the phase of each frame within a color frame; and means for capturing in response to the flag signal the component digital video signal such that it is in color frame phase with a reference component digital video signal.

2. The apparatus as recited in claim 1 wherein the reference component digital video signal has a number of frames equal to an integer multiple of the color frame from the composite analog video signal plus or minus one frame.

3. The apparatus as recited in claims 1 or 2 wherein the inserting means comprises:

means for detecting the start of active video in the component digital video signal to produce timing signals, means for determining a specified location and duration within the active video in the component digital video signal from the timing signals;

means for generating the flag signal as a function of the timing signals and a television standard signal; and means for inserting the flag signal into the one component at the specified location for the specified duration.

4. A method of controlling and detecting the alignment of a color frame phase from a composite analog video signal comprising the steps of:

decoding the composite analog video signal to generate a color frame signal and a component digital video signal;

inserting based upon the color frame signal a flag signal into the component digital video signal; and capturing the component digital video signal based upon the flag signal so that the captured component digital video signal is in color frame phase with a stored reference component digital video signal.

5. The method as recited in claim 4 wherein the stored reference component digital video signal has a length in video frames equal to an integer multiple of the color frame for the composite analog video signal plus or minus one video frame.

6. The method as recited in claims 4 or 5 wherein the inserting step comprises the steps of:

detecting the start of active video for the component digital video signal to produce timing signals;

determining a specified location and duration in the component digital video signal from the timing signals;

generating the flag signal as a function of the timing signals and a television standard signal; and inserting the flag signal into the one component of the component digital video signal at the specified location and for the specified duration.

7. An apparatus for controlling and detecting alignment of color frame phase in a composite analog video signal comprising:
- a decoder having as an input the composite analog video signal representing a test sequence processed by a system under test and having as outputs a component digital video signal and a color frame signal;
- a flag insertion circuit having as inputs the component digital video signal and the color frame signal and having as an output a modified component digital video signal with a flag signal generated as a function of the component digital video signal and the color frame signal inserted into one of the components of the component digital video signal at a specified location and for a specified duration; and
- an analyzer having as an input the modified component digital video signal for comparison with a reference component digital video signal representing the test sequence as input to the system under test, the analyzer using the flag signal in the modified component digital video signal to capture the modified component digital video signal when the color phase is aligned with that of the reference component digital video prior to such comparison.

8. The apparatus as recited in claim 7 wherein the test sequence comprises a test sequence having a number of frames equal to an integer multiple of the color frame for the composite analog video signal plus or minus one video frame.

9. The apparatus as recited in claims 7 or 8 wherein the flag inserter comprises:
- a start of video detect circuit having as an input the component digital video signal and providing as outputs timing signals;
- an insertion point circuit having as inputs the timing signals and the color frame signal and providing as outputs the specified location and duration;
- a flag generation circuit having as an input the timing signals and having as an output the flag signal, the value of the flag signal depending upon the particular video frame within the color frame of the composite analog video signal; and
- a selector having as inputs the component digital video signal and the flag signal and providing as an output the modified component digital video signal with the flag signal inserted into the one component.

\* \* \* \* \*